C. A. WATERBURY.
Car-Brake Wheels.

No. 138,968.  Patented May 13, 1873.

Witnesses.
John Becker.
Fred Haynes

C. A. Waterbury
by his Attorneys
Brown & Allen

UNITED STATES PATENT OFFICE.

CHARLES A. WATERBURY, OF NEW YORK, N. Y.

IMPROVEMENT IN RAILROAD-CAR BRAKE-WHEELS.

Specification forming part of Letters Patent No. 138,968, dated May 13, 1873; application filed April 9, 1873.

*To all whom it may concern:*

Figure 1:
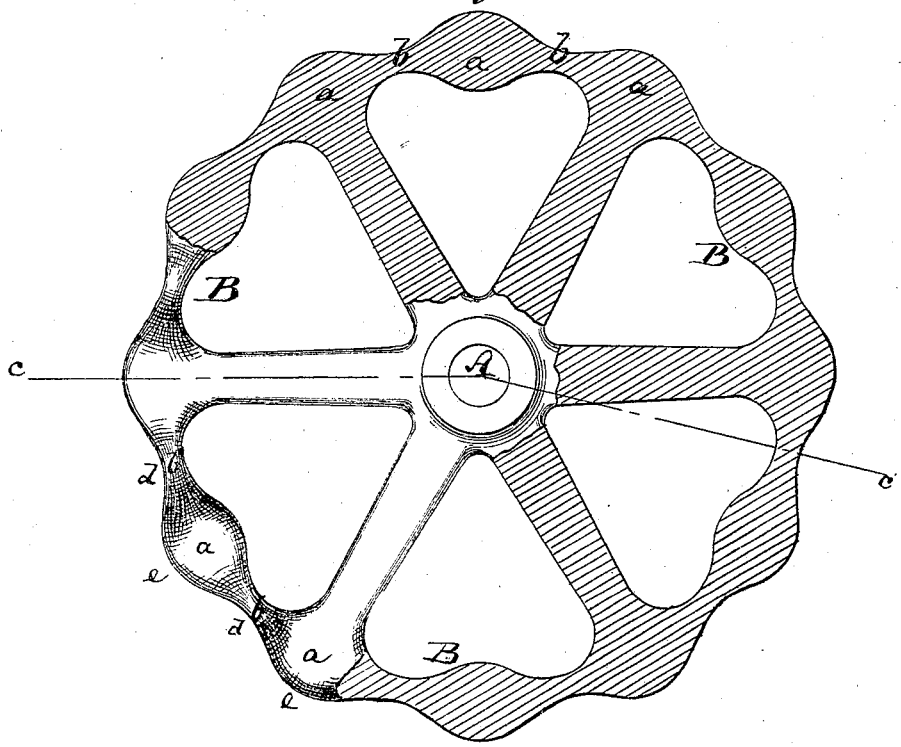
Figure 2:
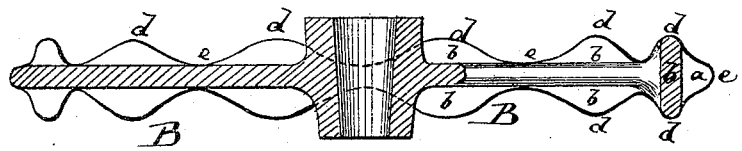

Be it known that I, CHARLES A. WATERBURY, of the city, county, and State of New York, have invented an Improved Brake Handle or Wheel, of which the following is a specification:

Figure 1 is a face view, partly in section, of my improved brake handle or wheel; and Fig. 2, a vertical section thereof.

Similar letters of reference indicate corresponding parts.

This invention has for its object to produce an improved brake wheel or handle for the use on railroad-cars drawn by locomotives or animals, with the object of obtaining a better hold than can be had on wheels of the present construction; and the invention consists in having the rim of the wheel in alternate horizontal and vertical undulations, so as to furnish a proper succession of ridges and depressions for the reception of the fingers and hands, giving, thereby, a greater power of grip to the attendant, and enabling him to successfully apply the brakes even if, by rain or ice, the rim of the wheel should be made wet or slippery. The ordinary smooth rims of brake-wheels frequently prevent the proper application of power when they are covered with ice or water, and cause the hands of the brakeman to slip against the spokes of the wheel, so that the little fingers of the hands will really receive the main resistance; it being thus clear that the weakest parts of the attendant's hands are brought into action where the strongest are desired. My improved double undulating wheel-rim will effectually overcome these difficulties, and, consequently, in many cases, preserve life and property where otherwise destruction would be inevitable.

In the accompanying drawing the letter A represents the shaft or stem upon which my improved wheel B is mounted. The rim of this wheel is, horizontally considered, and as indicated by the sectional part of the Fig. 1, alternately wide, as at $a$, and narrow, as at $b$; and vertically considered it is also alternately wide, as at $d$ in Fig. 2, and narrow, as at $e$ in the same figure. These two kinds of undulations, or alternate contractions and extensions, are so arranged with respect to each other that where the wheel is wide horizontally, as at $a$, it is narrow vertically, as at $e$; and where it is narrow horizontally, as at $b$, it is wide vertically, as at $d$. Therefore each portion of the wheel-rim is substantially of the same thickness and strength as every other portion thereof; and still, in the alternate depressions and ridges, the hand of the workman will find a proper and convenient support for his fingers and palms, so that he will be enabled to apply his full force to the wheel and properly to apply the brake.

The connection of the rim with the spokes of the wheel may be made in suitable manner, and the diameter and thickness of the wheel may also be varied at pleasure.

I claim as my invention, and desire to secure by Letters Patent—

A brake handle or wheel made with alternately vertical and horizontal undulations, substantially as and for the purpose herein shown and described.

C. A. WATERBURY.

Witnesses:
A. V. BRIESEN,
MICHAEL RYAN.